United States Patent [19]

Pirro

[11] Patent Number: 4,472,058
[45] Date of Patent: Sep. 18, 1984

[54] INJECTION ASSEMBLY FOR A MOLDING MACHINE

[76] Inventor: Armand A. Pirro, 8 Woodside Ave., Leominster, Mass. 01453

[21] Appl. No.: 463,902

[22] Filed: Feb. 4, 1983

[51] Int. Cl.³ .............................................. B29B 1/06
[52] U.S. Cl. ...................................... 366/78; 366/79; 425/376 B
[58] Field of Search ....................... 366/76, 77, 78, 79, 366/80, 81, 319; 425/376 B, 461, 562, 565, 564, DIG. 226, 207, 208

[56] References Cited

U.S. PATENT DOCUMENTS

| 2,834,050 | 5/1958 | Dymsza | 222/448 |
| 2,885,734 | 5/1959 | Wucher | |
| 3,012,280 | 12/1961 | Scott | |
| 3,401,426 | 9/1968 | Evans | |
| 3,482,285 | 12/1969 | Falkenberg | |
| 3,679,341 | 7/1972 | Graybill | 425/565 |
| 4,105,147 | 8/1978 | Stubbe | |

FOREIGN PATENT DOCUMENTS

| 2719497 | 9/1978 | Fed. Rep. of Germany | 425/DIG. 226 |
| 15027 | 9/1962 | Japan | 425/562 |

OTHER PUBLICATIONS

"Non-Return Valves in Screw Injection Moulding Machines" British Plastics, Feb. 1968, pp. 83-86.

Primary Examiner—Robert W. Jenkins
Attorney, Agent, or Firm—Warren B. Kice

[57] ABSTRACT

An injection assembly for an injection molding machine in which an auger is disposed in a bore formed in the molding machine and defines therewith an annular passage for receiving the material to be injected. A valve assembly is operatively connected to the auger and includes internal passages communicating with the annular passage and adapted to communicate with the mold. A sealing ring extends around the valve with the outer diameter of the sealing ring being in a sealing relation to the bore downstream of the annular passage. The inner diameter of the ring is slightly greater than the outer diameter of the valve to permit rotation of the valve relative to the sealing ring. As a result, upon rotation of the auger and the valve, the material is advanced along the annular passage and the internal passages while the sealing ring remains stationary and provides the sealing function.

8 Claims, 5 Drawing Figures

INJECTION ASSEMBLY FOR A MOLDING MACHINE

BACKGROUND OF THE INVENTION

This invention relates to an injection assembly for a molding machine and more particularly to such an assembly for controlling the flow of melt from a source and injecting same into a mold.

Since its inception, the screw injection molding machine has gradually replaced the piston type machine in applications when a plastic melt in a liquid form is to be injected into a mold. In operation of the screw injection molding machine, the plastic melt is usually introduced into an annular space defined between a bore wall formed in the molding machine and a machine screw, or auger, extending in the bore. Axial displacement of the melt occurs on rotation of the auger until a predetermined charge of melt is obtained and the melt is then injected into the mold through axial displacement of the assembly. A valve assembly is usually provided downstream of the auger to prevent backflow of the plastic melt from occurring during the injection stroke.

These type of arrangments require some type of sealing member to seal the annular space in the vicinity of the valve to prevent leakage of the plastic melt and to direct same into and through the valve. In most of these arrangements, a sealing ring would be secured relative to the valve for rotation and reciprocation therewith, with the outer diameter of the sealing ring being designed to proximate the inner diameter of the bore to provide this sealing function. However, the continuous rotational movement of the entire assembly results in undue wear on the corresponding bore portion of the machine in addition to wear on the ring, ultimately resulting in a compromise in the sealing function;

SUMMARY OF THE INVENTION

It is therefore an object of the present invention to provide an injection assembly for an injection molding machine in which a positive seal is achieved without any undue wear on the sealing member or its corresponding bore portion.

It is a further object of the present invention to provide an assembly of the above type in which a sealing ring is provided which is fixed with respect to rotational movement to minimize wear upon it and the corresponding bore portion.

It is a still further object of the present invention to provide an injection assembly of the above type in which the sealing ring is provided in a slightly loose fit relative to the valve-auger assembly so that upon rotation of the latter, the sealing ring remains stationary while performing its sealing function.

Toward the fulfillment of these and other objects, the injection assembly of the present invention comprises a auger disposed in a bore formed in the molding machine and defining an annular passage for receiving the material to be injected. A valve assembly is operatively connected to the auger for rotational movement therewith and includes internal passages communicating with the annular passage and with the mold. A sealing ring extends around the valve assembly with the outer diameter of the sealing ring being in a sealing relation with the bore downstream of the annular passage. The inner diameter of the ring is slightly greater than the outer diameter of the valve assembly portion on which it is mounted to permit rotation of the valve assembly relative to the ring. As a result, the material is advanced along the annular passage in response to rotation of the auger and valve assembly and passes through the internal passages and to the mold. By virtue of the sealing ring being stationary with respect to this rotational movement, the integrity of the seal is not compromised.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
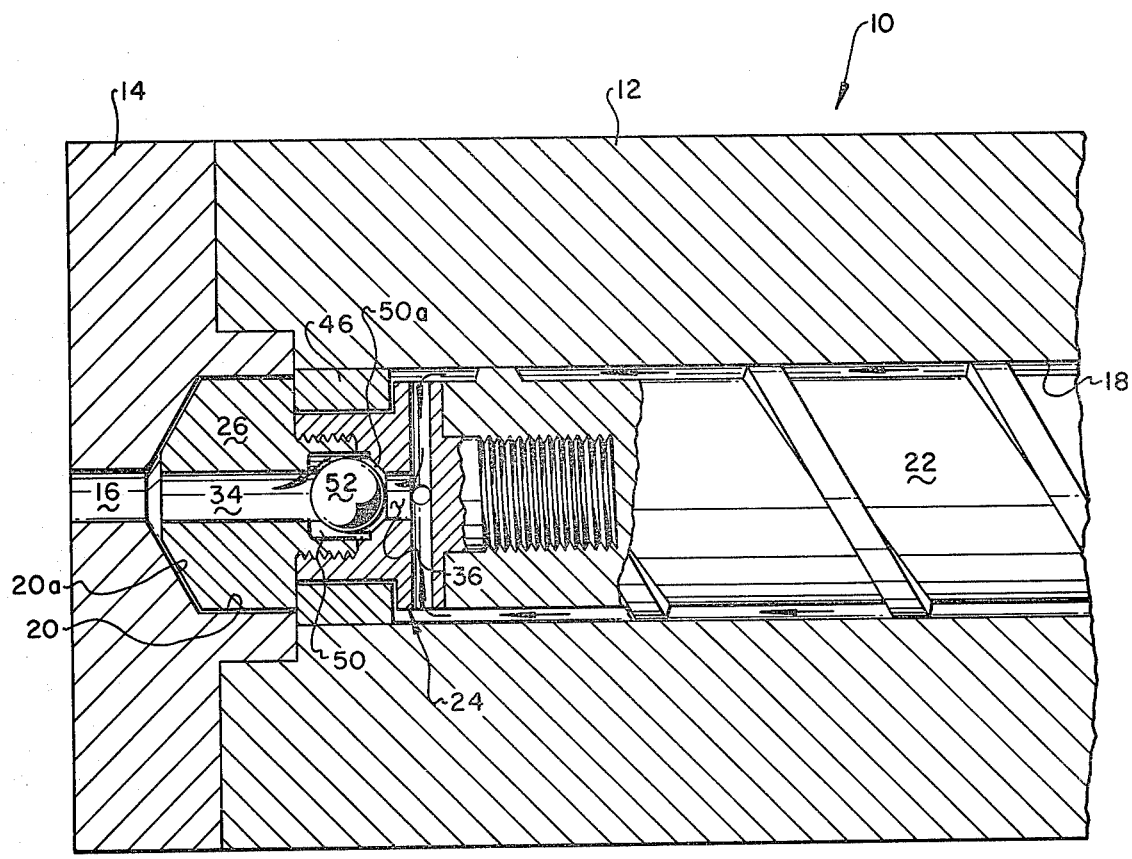
FIG. 1 is a partial, cross-sectional view of a portion of a molding machine incorporating the injection assembly of the present invention.

Referring to FIG. 1 of the drawing the reference numeral 10 refers in general to a portion of an injection molding machine which is adapted to receive a plastic melt material from an external source and inject same into a mold. The machine includes a barrel 12 having an end cap 14 secured to one end thereof in a conventional manner, with the other end of the barrel being adapted to receive plastic melt from an external source (not shown). The end cap 14 defines a discharge passage 16 which is adapted for connection to a nozzle, or the like, for the purpose of injecting the plastic melt into the mold in a manner to be described.

Figure 2:
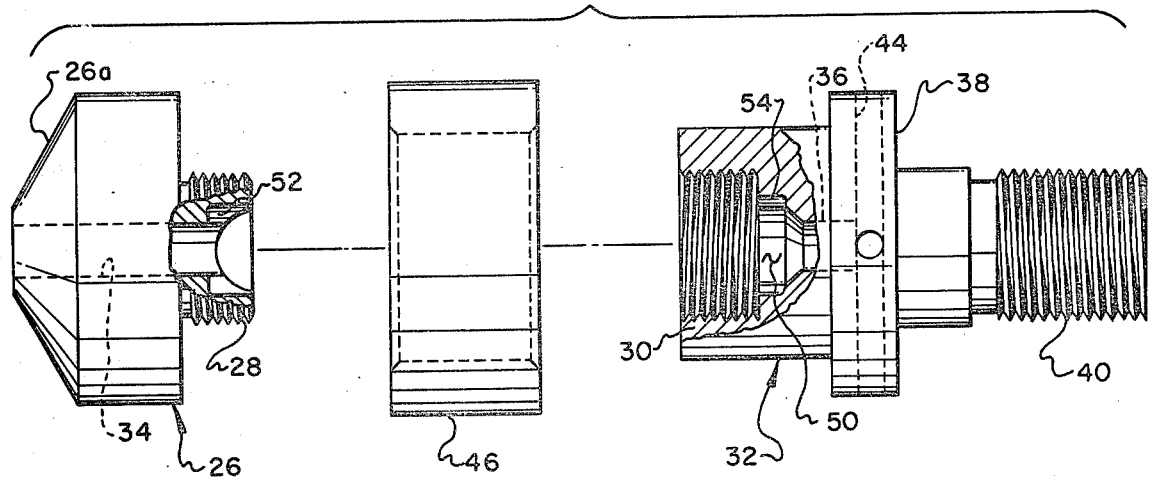
FIG. 2 is an exploded elevational view depicting a portion of the injection assembly of FIG. 1.

A cylindrical bore 18 extends axially through the barrel 12 and registers with a corresponding counterbore 20 formed in the end cap 14 and having a sloped bottom wall portion 20a. An auger 22 extends within the bore 18 and receives a valve assembly, shown in general by the reference numeral 24, and better depicted in detail in connection with FIG. 2.

The valve assembly 24 includes a front tip 26 having an externally threaded stud portion 28 which engages within a corresponding internally threaded cavity 30 formed in a screw stud member 32. The leading end portion of the front tip 26 is tapered as shown to complement the tapered bottom wall portion 20a of the chamber 20 (FIG. 1). An axially extending passage 34 is formed through the front tip 26 and a corresponding axially extending passage 36 is formed through that portion of the screw stud member 32 that does not contain the internally threaded cavity 30. The screw stud member 32 includes a circular flange 38 and a externally threaded stud member 40 which engages in a corresponding internally threaded bore formed in the auger 22 (FIG. 1). Four radially extending passages 44 are formed in the flange portion 38 of the screw stud member 32 in communication with the axial passage 36.

Figure 3:
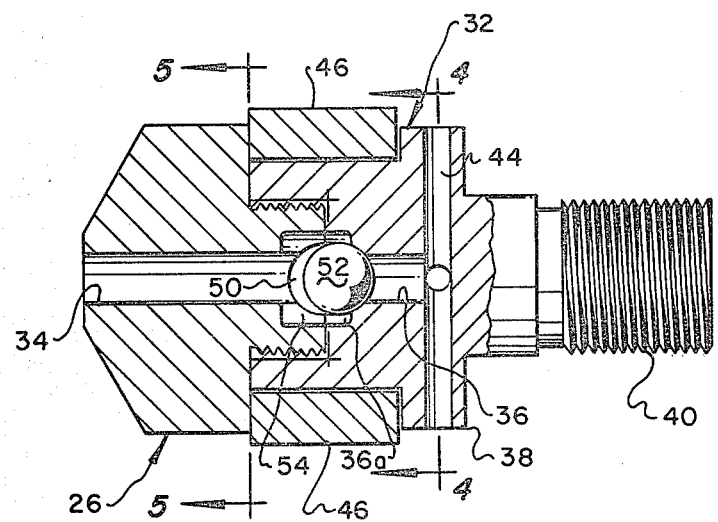
FIG. 3 is an enlarged cross-sectional view of a portion of the injection assembly of FIG. 1.
Figure 4:
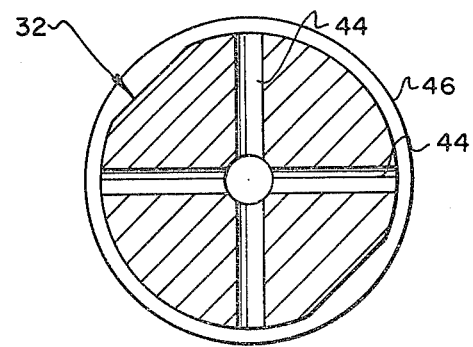
FIGS. 4 and 5 are vertical cross-sectional views taken along the lines 4—4 and 5—5 respectively, of FIG. 3.

A sealing ring 46 is provided which extends over the screw stud 32 and between the rear face of the front tip 26 and the front face of the flange 38 of the screw stud 32, as better shown in FIG. 3. The outer diameter of the sealing ring 46 is designed so as to very closely approximate the inner diameter of the bore 18 to provide a relatively loose friction fit therebetween, while the inner diameter of the ring 46 is selected to be slightly greater than that of the corresponding portion of the screw stud 32 so as to permit relative rotation therebetween.

Figure 5:
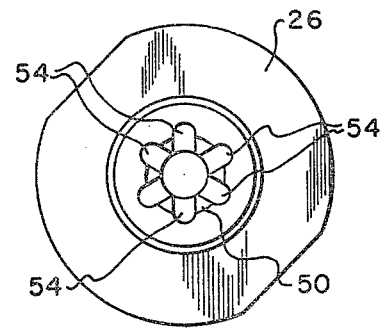

The passages 34 and 36 of the front tip 26 and the screw member 32, respectively, have enlarged portions at their corresponding ends as shown to define a valve chamber 50 which receives a ball valve 52. The rear wall defining the chamber 50 is formed into a seat 50a for the ball valve 52 for reasons that will be described later. As better shown in FIG. 5, the chamber 50 includes fluted portions 54 each of which has a radial dimension larger than that of the ball valve 52 to permit flow therethrough as also will be described in detail later.

In operation, the assembly is initially placed in the position shown in FIG. 1, i.e. with the front tip 26 completely seated within the chamber 20. Material to be injected is fed from an external source (not shown) into the annular passage formed between the wall defining the bore 18 and the auger 22. The material is advanced along this passage by virtue of rotation of the auger 22 and therefore the valve assembly 24, but excluding the sealing ring 46 which remains stationary to rotational movement.

The material passes through the passages 44 and into the axial passage 34 where it passes through the chamber 50 including the fluted portions 54 and through the passage 34 to the end cap 14. It is understood that the end cap 14 is connected to a nozzle, or the like, (not shown) which, during this mode of operation, is closed so that the material builds up in the discharge passage 16 and backflows into the gap between the front tip 26 and the corresponding tapered bottom wall portion 20a of the chamber 20, causing the entire assembly including the auger 22, the valve assembly 24 and the sealing ring 46 to move backwards, or in a direction from left-to-right as viewed in FIG. 1. This backward movement continues for a predetermined distance until the assembly is stopped by external means. During the backward movement, as the valve assembly 24 progressively vacates the corresponding end portion of the bore 18 shown in FIG. 1, the latter is filled with the material. The introduction of additional material into the annular passage and the rotation of the assembly continues for a relatively short period of time to create an additional back pressure which acts through the passages 16 and 34 and directly against the front face of the ball valve 52 to force it against the seat 50A and thus prevent the flow of any more material through the valve assembly 24 and into the bore 18. The material feed is then stopped and the amount of material disposed in the chamber 18 corresponds to that which is to be injected. Then the nozzle associated with the end cap 14 is opened and the auger 22, and therefore the valve assembly 24 and the sealing ring 46, are driven in a direction from right-to-left by an external means, to inject the material into the mold.

It can be appreciated that the sealing ring 46 by virtue of being fixed against rotational movement, does not wear nor cause any appreciable wear on the corresponding portion of the wall defining the bore 18, and therefore will enjoy a relatively long life when compared to sealing rings that are fixed with respect to the valve or valve assembly.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. An injection assembly for an injection molding machine comprising rotatable means disposed in a bore formed in said machine and cooperating with the wall defining said bore to form an annular passage for receiving the material to be injected, internal passage means formed in said rotatable means downstream of said annular passage for receiving said material from said annular passage, said internal passage means being adapted to communicate with a mold, and a sealing ring extending around said rotatable means, the outer diameter of said sealing ring being in a sealing relationship to said bore downstream of said annular passage and the inner diameter of said ring being slightly greater than the outer diameter of said rotatable means so that said ring remains stationary during rotation of said rotatable means.

2. The assembly of claim 1 wherein said rotatable means includes an auger blade extending in said annular passage for advancing said material down said annular passage upon rotation of said rotatable means.

3. The assembly of claim 1 wherein said rotatable means includes valve means for preventing the backflow of material from said mold to said internal passage means.

4. The assembly of claim 1 wherein said rotatable means comprises a front tip member and a screw stud member connected to said front tip member, each of said members having a circular cross section, said front tip member having a diameter that is greater than that of said screw stud member and said screw stud member having an annular flange extending therefrom.

5. The assembly of claim 4 wherein said sealing ring extends between said flange and the rear face of said front tip member.

6. The assembly of claim 4 wherein said internal passage means comprise a plurality of radial passages extending through said flange and in communication with said annular passage, and an axial passage communicating with said radial passages and adapted to communicate with a mold.

7. The assembly of claim 6 wherein said rotatable means includes valve means for preventing the backflow of material from said mold to said internal passage means.

8. The assembly of claim 7 wherein said valve means comprises a ball valve moveable in said axial passage and adapted to engage a seat.

* * * * *